US012683339B2

(12) United States Patent
K et al.

(10) Patent No.: US 12,683,339 B2
(45) Date of Patent: Jul. 14, 2026

(54) PANEL MOUNT CONNECTOR HAVING A SNAP-FIT CLIP MODULE

(71) Applicants: TE Connectivity India Private Limited, Bangalore (IN); Tyco Electronics UK LTD, Swindon (GB); Deutsch India Power Connectors Private Ltd., Bangalore (IN)

(72) Inventors: Vinesh K, Bangalore (IN); Aravindh K, Bangalore (IN); Ross McSherry, Swindon (GB); Jack Brown, Swindon (GB)

(73) Assignees: Tyco Electronics UK Ltd., Swindon (GB); TE Connectivity India Private Limited, Bangalore (IN); Deutsch India Power Connectors Private Ltd., Bangalore (IN)

( * ) Notice: Subject to any disclaimer, the term of this patent is extended or adjusted under 35 U.S.C. 154(b) by 453 days.

(21) Appl. No.: 18/150,238

(22) Filed: Jan. 5, 2023

(65) Prior Publication Data

US 2024/0235131 A1 Jul. 11, 2024

(30) Foreign Application Priority Data

Jan. 5, 2022 (EP) .................................... 22150350

(51) Int. Cl.
*H01R 13/74* (2006.01)
*H01R 13/52* (2006.01)

(52) U.S. Cl.
CPC ....... *H01R 13/743* (2013.01); *H01R 13/5202* (2013.01)

(58) Field of Classification Search
CPC .................................................... H01R 13/743
USPC .......................................................... 439/519
See application file for complete search history.

(56) References Cited

U.S. PATENT DOCUMENTS

| | | | | |
|---|---|---|---|---|
| 5,249,982 | A * | 10/1993 | Funck | H01R 13/743 439/556 |
| 7,575,482 | B1 * | 8/2009 | Pepe | H01R 4/2433 439/676 |
| 10,700,479 | B1 * | 6/2020 | Smith | H01R 13/745 |
| 2003/0114044 | A1 * | 6/2003 | Nakamura | H01R 13/745 439/557 |
| 2004/0067682 | A1 | 4/2004 | Korsunsky et al. | |
| 2007/0190835 | A1 * | 8/2007 | Yamakado | H01R 13/743 439/157 |
| 2009/0098768 | A1 | 4/2009 | Giefers | |
| 2010/0291789 | A1 | 11/2010 | Fujisaki | |
| 2012/0071023 | A1 | 3/2012 | Kuhlmann | |

(Continued)

FOREIGN PATENT DOCUMENTS

| | | |
|---|---|---|
| DE | 29907005 U1 | 7/1999 |
| EP | 29780725 A2 | 6/2015 |

(Continued)

*Primary Examiner* — Tulsidas C Patel
*Assistant Examiner* — Thaslimur Rahman
(74) *Attorney, Agent, or Firm* — Barley Snyder

(57) ABSTRACT

A panel mount connector adapted to be mounted to a panel comprises a housing and snap-fit clip module. The housing includes a collar adapted to abut against the panel and a receptacle. The clip module is arranged within the receptacle and has at least one latching element adapted to generate a snap-fit with the panel.

23 Claims, 5 Drawing Sheets

(56) References Cited

U.S. PATENT DOCUMENTS

| | | | | |
|---|---|---|---|---|
| 2014/0016901 | A1* | 1/2014 | Lambourn ........... | G02B 6/3817 385/75 |
| 2016/0131856 | A1* | 5/2016 | Annis .................. | G02B 6/3893 385/76 |
| 2020/0027430 | A1 | 1/2020 | Marticorena | |
| 2020/0274304 | A1 | 8/2020 | Kosaka et al. | |

FOREIGN PATENT DOCUMENTS

| | | | |
|---|---|---|---|
| EP | 3018767 | A1 | 5/2016 |
| WO | 2015165917 | A1 | 11/2015 |

* cited by examiner

PANEL MOUNT CONNECTOR HAVING A SNAP-FIT CLIP MODULE

CROSS-REFERENCE TO RELATED APPLICATIONS

This application claims the benefit of European Patent Application No. 22150350.1 filed on Jan. 5, 2022, the whole disclosure of which is incorporated herein by reference.

FIELD OF THE INVENTION

The present invention relates to a panel mount connector configured to be mounted to a panel.

BACKGROUND

Panel mount connectors are often used for power and/or signal transmission in electric appliances. Thus, they enable communication between a front of the panel and a rear of the. Traditional fixation systems make use of screws to fix the panel mount connector to a mating connector clamping the panel. However, the assembly of such a connection system is more complicated due to the use of screws, since more parts need to be handled during the assembly operation. For maintenance purposes, simple mounting and dismounting of the panel mount connector is desired.

SUMMARY

According to an embodiment of the present disclosure, a panel mount connector adapted to be mounted to a panel comprises a housing and snap-fit clip module. The housing includes a collar adapted to abut against the panel and a receptacle. The clip module is arranged within the receptacle and has at least one latching element adapted to generate a snap-fit with the panel.

BRIEF DESCRIPTION OF THE DRAWINGS

The invention will now be described by way of example with reference to the accompanying Figures, of which.

DETAILED DESCRIPTION OF THE EMBODIMENTS

Figure 2:
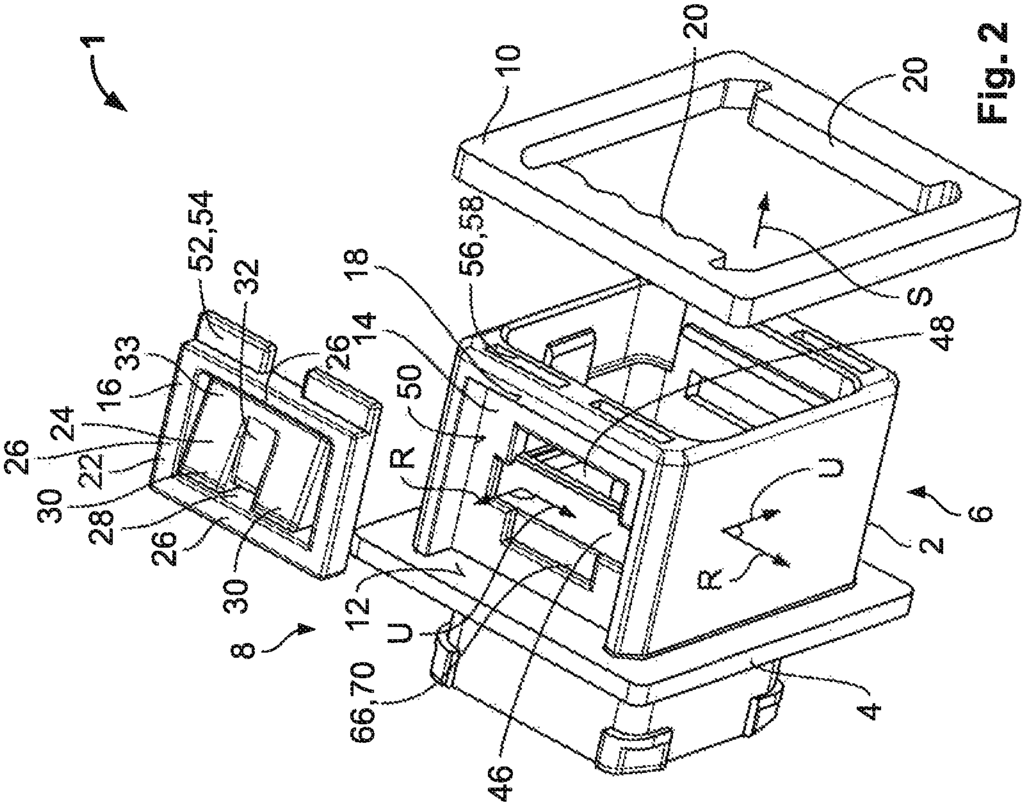
FIG. 2 shows a schematic explosion view of the panel mount connector shown in FIG. 1.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
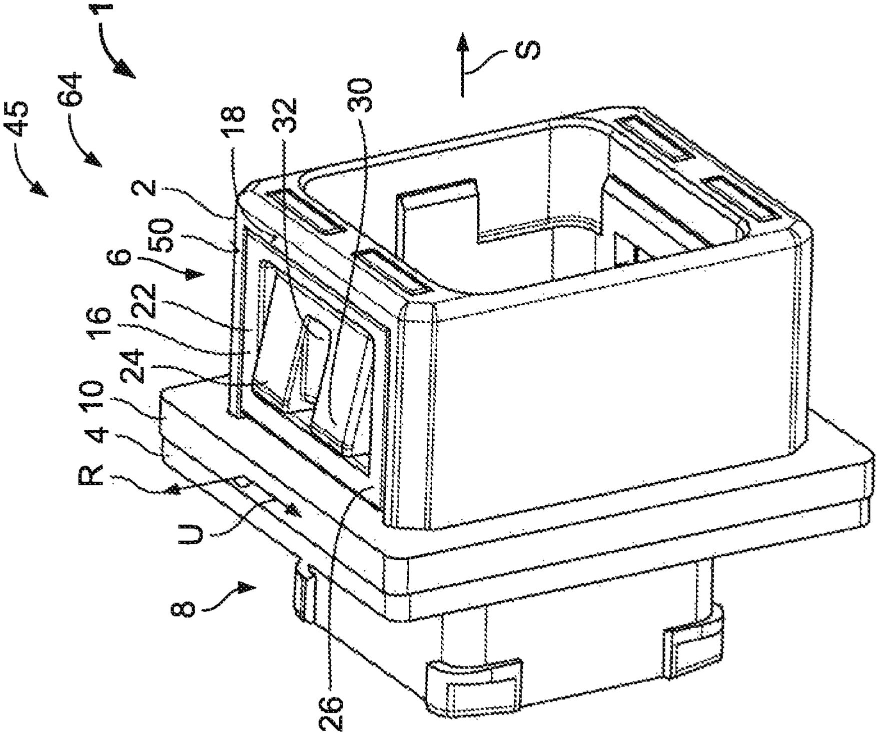
FIG. 1 shows a schematic perspective view of an exemplary embodiment of a panel mount connector.

With reference to FIGS. 1 and 2, a first exemplary embodiment of a panel mount connector 1 is described. FIG. 1 shows the first embodiment in a schematic perspective view and FIG. 2 shows it in a schematic explosive view. The panel mount connector 1 comprises a housing 2 having a collar 4 protruding in a radial direction R. It should be noted that in the context of this description, the term "radial direction" or "radially" is also used for non-circular shapes as is the case in the first embodiment. In this case, the term "radially" means "perpendicular to a peripheral direction" or "laterally". The collar 4 protrudes from the remainder of the housing in the radial direction R perpendicular to the peripheral direction U and a mounting direction S. Consequently, the collar 4 separates a rear end face 6 and a front-end face 8 in the mounting direction S, so that the rear end face 6 and the front-end face 8 are arranged on different sides of the panel, when the panel mount connector 1 is mounted to the panel.

A gasket 10 is provided, extending around the housing 2 adjoining to the collar 4, such that the gasket 10 is supported on a surface 12 of the collar 4 facing the rear end face 6. The gasket 10 may be electrically conductive. For example, the gasket 10 may be formed from a fluorosilicone that is charged with aluminum and/or silver. In this case, the gasket 10 may further serve as an electromagnetic shield improving the shielding efficiency of the connector 1.

The housing 2 further comprises a receptacle 14 for receiving a snap-fit clip module 16 arranged adjacent to the collar 4, as can best be seen in FIG. 2. The receptacle 14 may be formed on a top surface 18 of the rear end face 6 and extend from the collar 4 parallel to the mating direction S away from the collar 4. The receptacle 14 may have a cuboid shape. In particular, the receptacle 14 may have a rectangular cross section in a plane spanned by the mating direction S and the peripheral direction U.

A radially inwards protruding flap 20 of the gasket 10 may be configured to be received in the receptacle 14 for securing the gasket 10 to the housing 2. Preferably, a second receptacle 14 is located on an opposite side of the housing 2. The second receptacle 14 may be formed identical to the first receptacle 14. In each receptacle 14, a separate snap-fit clip module 16 may be inserted. Preferably, the snap-fit clip modules 16 are structurally identical. When the snap-fit clip module 16 is inserted into the receptacle 14, the flap 20 of the gasket 10 may be received in the receptacle 14 between the snap-fit clip module 16 and the collar 4.

Figure 3:
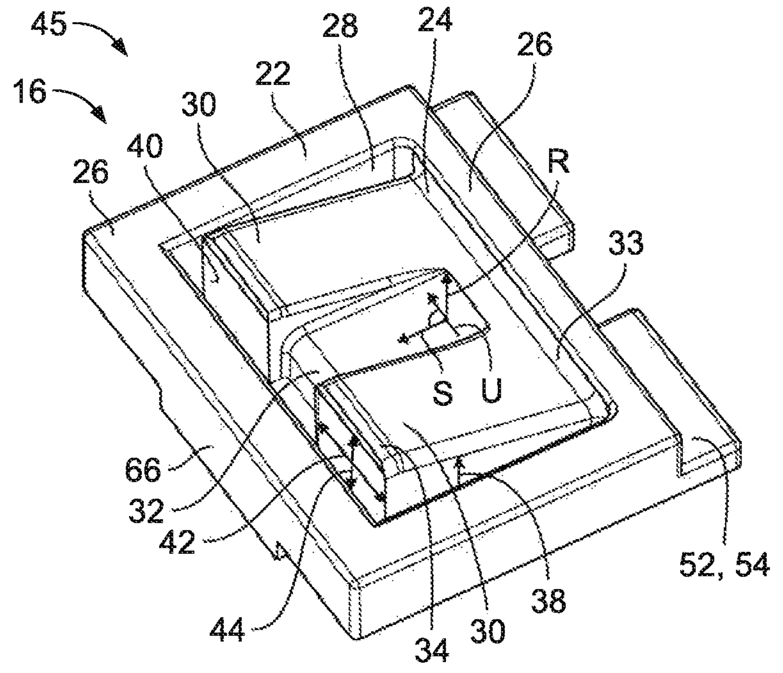
FIG. 3 shows a schematic perspective view of an exemplary embodiment of a snap-fit clip module.
Figure 4:
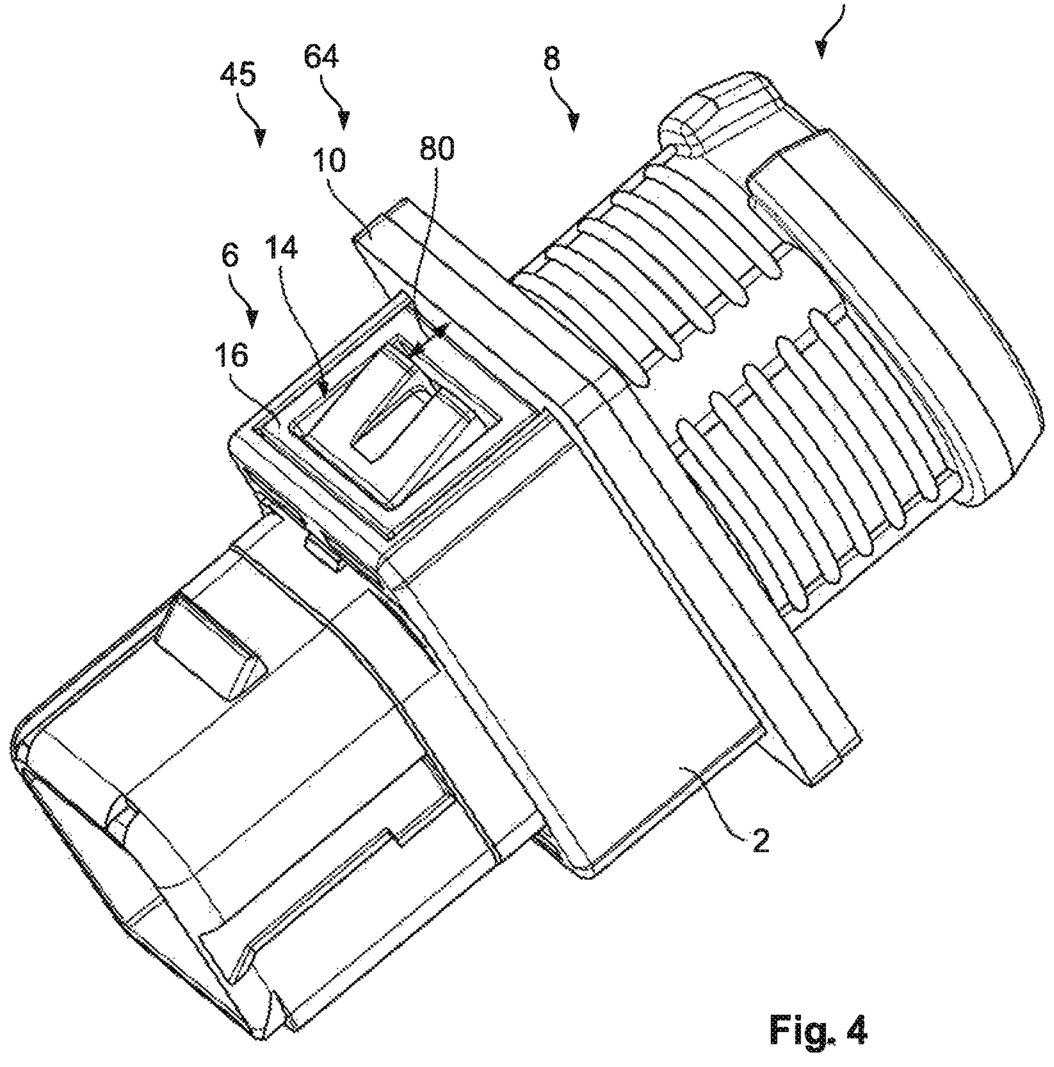
FIG. 4 shows a schematic perspective view of a second exemplary embodiment of a panel mount connector.

An exemplary embodiment of the snap-fit clip module 16 is shown in a schematic perspective view in FIG. 3. In this exemplary embodiment, the snap-fit clip module 16 is formed as an injection molded component having a frame structure 22 and a latch structure 24. The frame structure 22 comprises beams 26 forming an essentially rectangular shape defining an opening 28.

The latch structure 24 may preferably be cantilevered, protruding from one side of the frame structure 22 facing the opening 28. In other words, the latch structure 24 may extend from one beam 26 into the opening 28. For abutment with the panel, the latch structure 24 may comprise at least one latching element 30. In this exemplary embodiment, two parallel latching elements 30 are shown, which are connected to one another in a motion transmitting manner. In order to achieve the motion transmitting coupling between the two latching elements 30, a web 32 is provided. The web 32 extends from one latching element 30 to the other. The latching elements 30 may extend obliquely from a base 33 attached to the beam 26 into the opening 28 to a free end 34 such that the latching elements 30 project radially out of the opening 28. Preferably, the free end 34 does not reach the beam 26 arranged opposite the base 33, such that said beam 26 does not interfere with the deflection of the latching elements 30.

The latching elements 30 may be rigid in a direction parallel to the mounting direction S, in comparison to a direction parallel to the radial direction R. Therefore, the latching elements 30 may press against the panel with a high pressing force without strong deformation. To do this, the latching elements 30 may enclose a volume 36, which is preferably solid. The volume 36 may have a triangular cross section in a plane spanned by the mounting direction S and the radial direction R. In particular, the latching elements 30 may each comprise a material thickness 38 in the radial direction R, which gradually increases towards the free end 34. The latching elements 30 may thus each comprise a front face 40 facing the collar 4, when the snap-fit clip module 16 is inserted into the receptacle 14. The front face 40 has a width 42 essentially parallel to the peripheral direction U and a depth 44 essentially parallel to the radial direction R, wherein the depth 44 is smaller than the width 42 but at least half the size of the width 42.

The snap-fit clip module 16 may be clipped in the receptacle 14 as is shown in FIG. 1, for example, in order to secure the snap-fit clip module 16 in the receptacle 14. When inserted in the receptacle 14, a top surface of the frame may be arranged essentially flush with the top surface 18 of the part of the housing 2 surrounding the receptacle 14.

The latching elements 30 may project out of the receptacle 14 in the radial direction R with an increasing depth towards the free end 34. The latching elements 30 may be elastically deflectable, such that they can be pushed into the receptacle 14 in the radial direction R, when a force is applied. Preferably, the latching elements 30 may project out of the receptacle 14 in an initial, undeformed state 45 as is shown in FIGS. 1-7, 9 and 10. Therefore, the latching elements 30 automatically snap back into the initial state, when a force causing the deflection is released.

To allow the latching elements 30 to be deflected, the receptacle 14 may be provided with a depression 46. The depression 46 may preferably be arranged to receive the front end 40 and may act as a support for preventing an excessive deflection of the latching elements 30. A through hole 48 may be provided in the receptacle 14, adjacent to the depression 46 in the mounting direction S. The through hole 48 may allow access to an inner volume surrounded by the housing 2, so that hooks of a complementary connector can reach into the through hole 48 locking the complementary connector to the housing 2.

The housing 2 and the snap-fit clip module 16 may particularly be formed from the same material. At least the snap-fit clip module 16 may be electrically isolating. It may, for example, be formed from a dielectric material, particularly a thermoplastic material.

In various applications, specific performance requirements have to be met. For example, the application may have specific requirements concerning the shielding effectiveness and/or surface transfer impedance. To achieve this, the housing 2 may be provided with a plating 50, particularly a multi-layer plating. The housing 2 may be plated with a copper plating and a nickel plating on top of the copper plating. Particularly, the entire outer surface of the housing may be plated. Preferably, the receptacle 14 may be plated.

The snap-fit clip module 16, on the other hand, is preferably not plated. As the snap-fit clip module 16 and the housing 2 are separate components, plating of the housing 2 may be facilitated. If the housing 2 and the snap-fit clip module 16 were formed integrally with one another, additional provisions would be required in order to plate the housing but not the snap-fit clip module.

The fixation of the snap-fit clip module 16 in the receptacle 14 is further elucidated with reference to the second exemplary embodiment of the panel mount connector 1 shown in FIGS. 3 to 6. The second embodiment differs from the first embodiment in that the front-end face 8 has a different structure. The remainder of the housing 2, particularly the receptacle 14, and the snap-fit clip module 16 are identical to the first embodiment. It should be noted that the front-end face 8 may be adapted for any kind of complementary connector or terminals, for which the first and second embodiment only show different examples.

Figure 5:
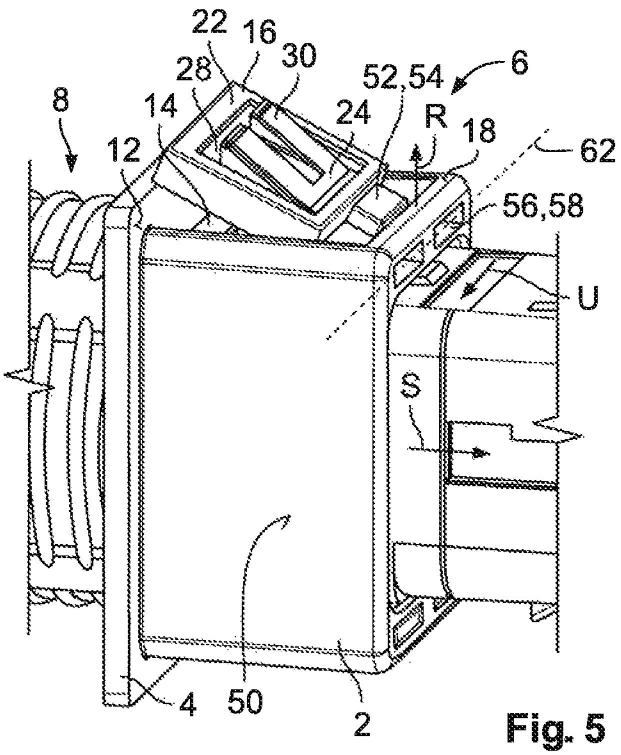
FIG. 5 shows a schematic perspective view of the panel mount connector with the snap-fit clip module being in an initial position.

The snap-fit clip module 16 comprises a pair of catch elements 52 in the form of protrusions 54 protruding parallel to the mounting direction S from the frame structure 22. Particularly, the catch elements 52 and the latch structure 24 may extend from the same beam 26, wherein the latch structure 24 extends into the opening 28 and the catch elements 52 to the outside. The two catch elements 52 are arranged in the respective corner of the beam 26 and spaced apart from one another. The housing 2 comprises complementary catch elements 56 in the form of slots 58 opening into the receptacle 14. In an initial position 60 as indicated in FIG. 5, the housing 2 and the snap-fit clip module 16 may be detached from one another, wherein the catch elements 52 and the complementary catch elements 56 form a pivot axis 62 around which the snap-fit clip module 16 is held pivotable relative to the housing 2 from the initial position 60 to a catch position 64 (see FIG. 6).

Figure 6:
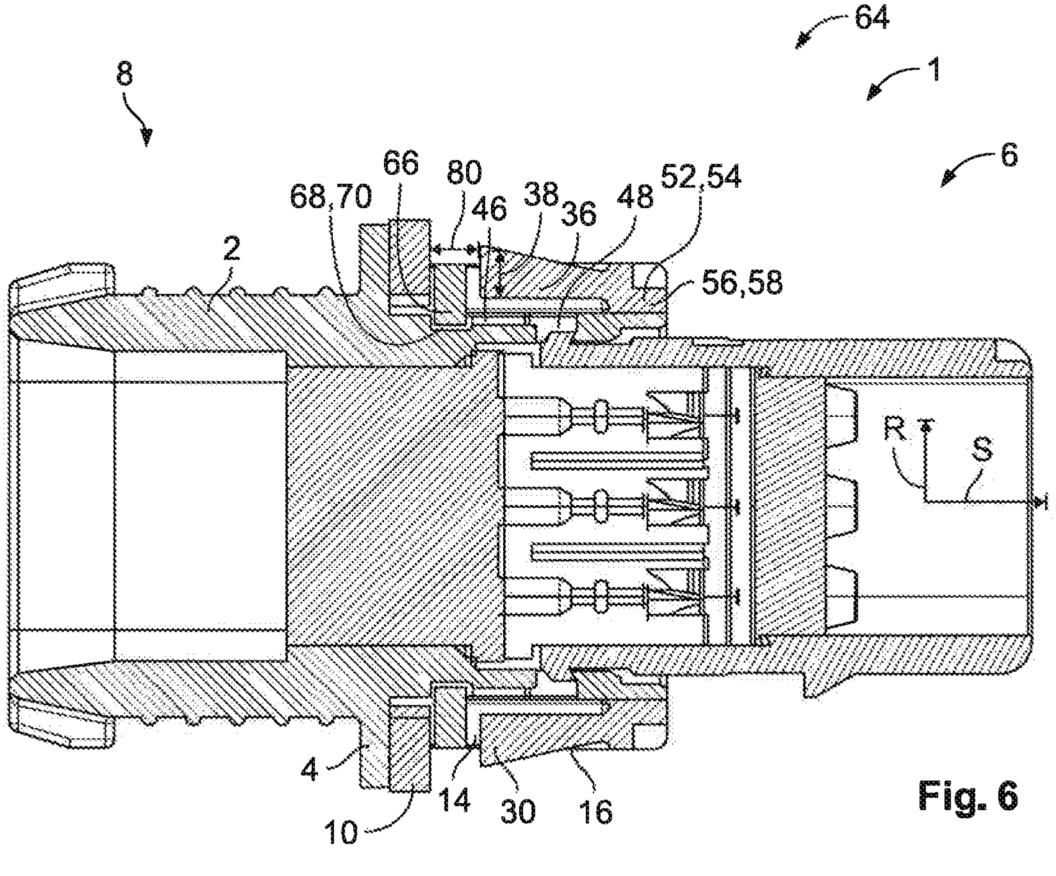
FIG. 6 shows a schematic cut view of the panel mount connector shown in FIG. 4.

As can be seen in FIG. 6, the protrusions 54 are fully received in the respective slots 58 such that a movement of the snap-fit clip module 16 relative to the housing 2, at least in the peripheral direction U as well as the radial direction R, is blocked. In addition to the catch elements 56, the snap-fit clip module 16 may be provided with a securing element 66 protruding in the radial direction R from the beam 26 arranged opposite the catch elements 56. The securing element 66 protrudes further into the receptacle 14 and in the catch position 64 is received in a complementary securing element 68, formed as a recess 70. The recess 70 is preferably arranged adjoining the depression 46 and has a larger depth than the depression 46. In the catch position 64 the securing element 66 engages the complementary securing element 68, pushing the catch elements 52 further into the slots 58. The securing elements 66, 68 block a relative motion of the snap-fit clip module 16 and the housing 2 in the mounting direction S, meaning that the catch elements 52 are locked in the slots 58. Therefore, a pivoting motion from the catch position 64 back into the initial position 60 (e.g., due to vibrations or the like) may be prevented.

With reference to FIGS. 7-10, an exemplary embodiment of an assembly 72 is shown. The assembly 72 comprises a panel 74 having at least one opening 76 for receiving the panel mount connector 1 in the mounting direction S. The opening 76 may be smaller than the collar 4 but bigger than the rear end face 6 of the housing 2. Thus, the rear end face 6 of the housing 2 may be pushed through the opening 76 without grinding along the edges 78 of the opening 76. Hence, the plating 50 of the housing 2 is not scraped off.

Figure 8:
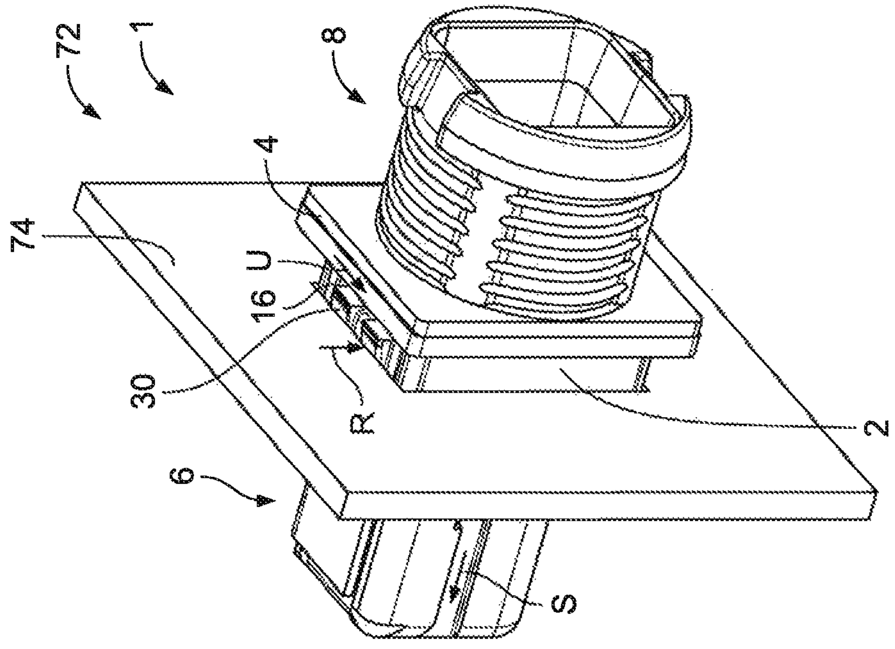
FIG. 8 shows a schematic perspective view of the assembly, wherein the panel mount connector is pushed through the opening of the panel.
Figure 7:
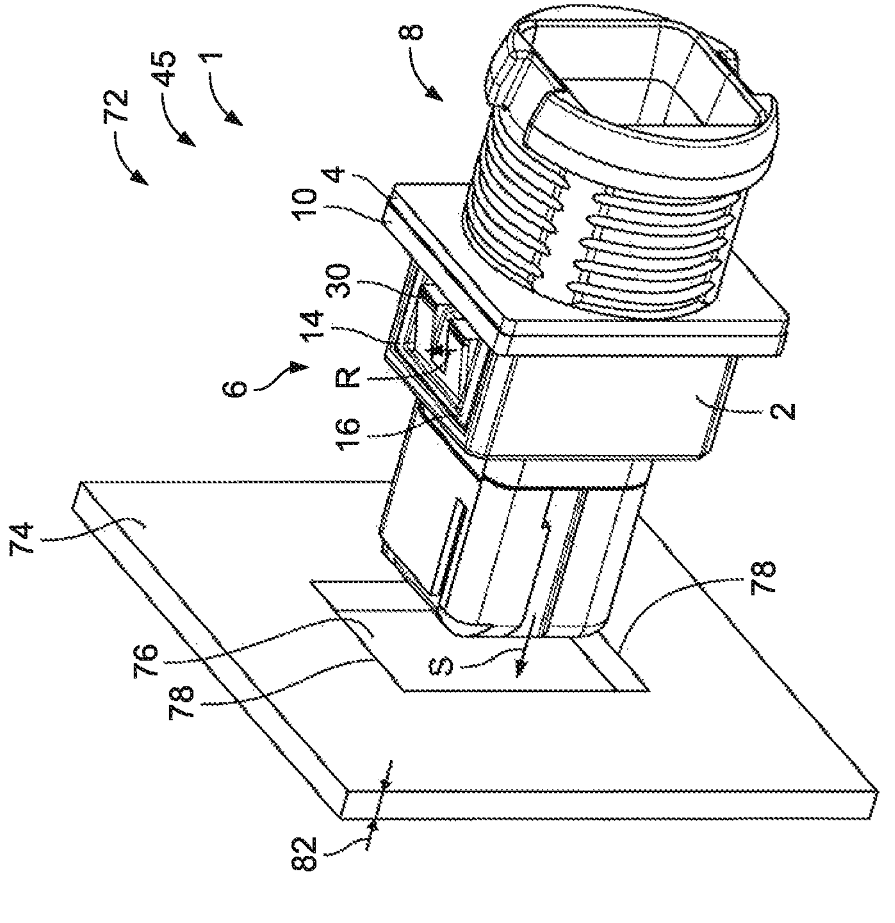
FIG. 7 shows a schematic perspective view of an assembly comprising a panel and a panel mount connector.
Figure 10:
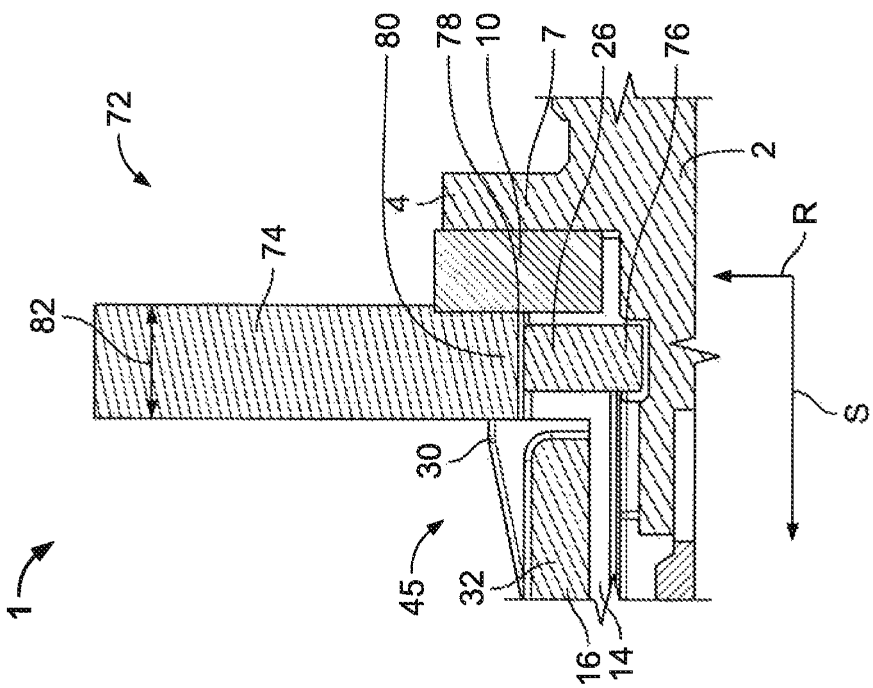
FIG. 10 shows a schematic cut view of the assembly shown in FIG. 9.
Figure 9:
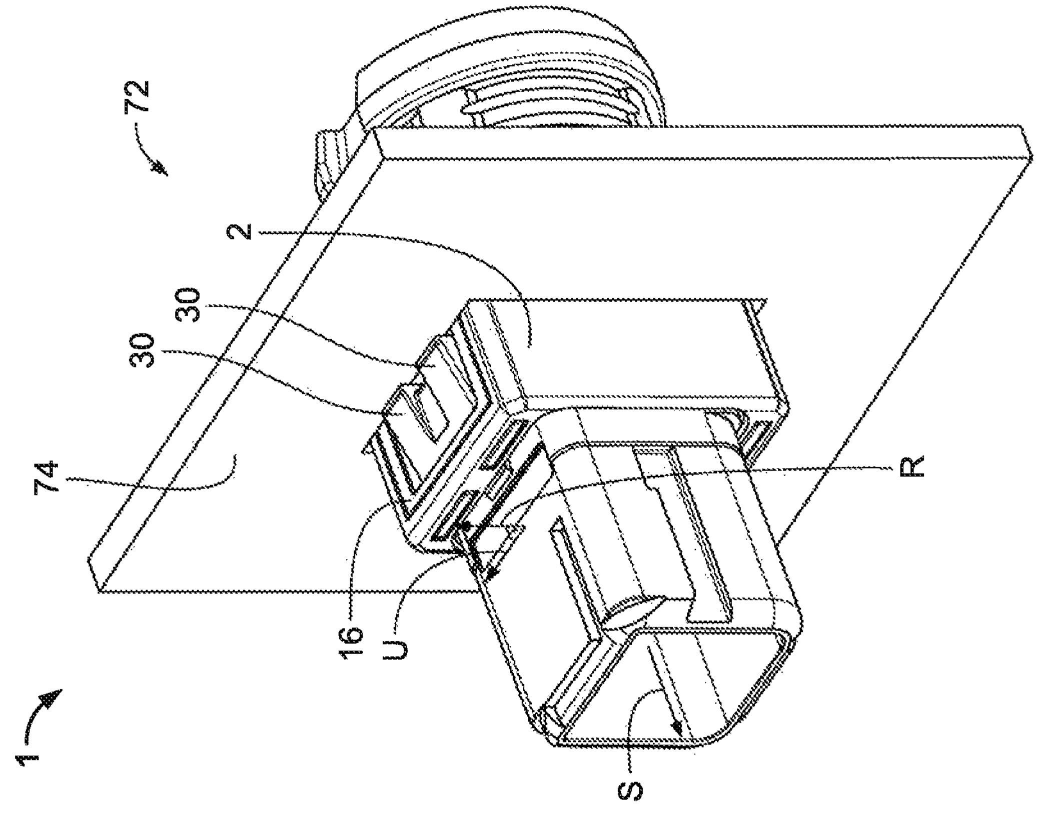
FIG. 9 shows a schematic perspective view of the assembly, wherein the panel mount connector is received in the opening and fixed to the panel.

As can be seen in FIG. 8, when pushing the rear end face 6 through the opening 76, the edge 78 presses the latching elements 30 into the recess. An advantage of an un-plated or non-plated snap-fit clip module is that any plating failure may be mitigated. If the snap-fit clip module 16 is plated, the plating may be damaged during the insertion of the connector into the opening of the panel. Once the latching elements 30 passes through the opening 76, the latching elements 30 snap back into the initial, undeflected state 45, as shown in FIGS. 9 and 10. The panel 74 is then arranged in a gap 80 between free end 34 and the gasket 10. The latching elements 30 press with their front face 40 against the panel 74, clamping the panel between the collar 4 and the latching elements 30. In this case, a beam 26 of the frame structure 22 is received in the opening 76. Therefore, the panel 74 overlaps with the beam 26 further securing the snap-fit clip module 16 in the receptacle 14.

The panel 74 may have a predetermined material thickness 82 that is greater than the gap 80 between front face 40 and the gasket 10. Therefore, the gasket 10 may be compressed, further ensuring proper sealing of the opening 76. For example, the predetermined material thickness may be 1.6 mm and the panel mount connector 1 may be configured such that when mounted to the panel 74, the gasket 10 is compressed by 0.09 mm.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A panel mount connector adapted to be mounted to a panel, comprising:
- a housing, including:
  - a collar adapted to abut against the panel; and
  - a receptacle;
- a snap-fit clip module removably arranged within the receptacle and having at least one latching element adapted to generate a snap-fit with the panel; and
- a gasket, a radially inwards protruding flap of the gasket is received in the receptacle and secures the gasket to the housing.

2. The panel mount connector according to claim 1, wherein the snap-fit clip module is fastened to the receptacle.

3. The panel mount connector according to claim 2, wherein the housing and the snap-fit clip module are formed from the same material.

4. The panel mount connector according to claim 3, wherein the snap-fit clip module is electrically isolating.

5. The panel mount connector according to claim 4, wherein the housing is plated with a conductive material.

6. The panel mount connector according to claim 5, wherein the snap-fit clip module is not plated.

7. The panel mount connector according to claim 1, wherein at least two snap-fit clip modules are provided and attached to respective opposite sides of the housing.

8. The panel mount connector according to claim 1, wherein the receptacle defines a depression for receiving the at least one latching element as the at least one latching element is deflected radially inwards.

9. The panel mount connector according to claim 8, wherein the snap-fit clip module and the housing define complementary catch elements that in combination form a pivot axis around which the snap-fit clip module is held pivotable relative to the housing from an initial position to a catch position.

10. The panel mount connector according to claim 9, wherein the snap-fit clip module and the housing include complementary securing elements engaging one another during the pivoting motion into the catch position and blocking a pivoting motion of the snap-fit clip module relative to the housing from the catch position to the initial position.

11. The panel mount connector according to claim 1, wherein the snap-fit clip module defines a frame structure and a latch structure, the latch structure defining the at least one latching element, the frame structure defining an opening in which the latch structure is received, the latch structure extending from one side of the frame structure into the opening.

12. The panel mount connector according to claim 1, wherein the snap-fit clip module comprises at least two latching elements, the at least two latching elements being arranged adjacent to one another and being connected to one another in a motion transmitting manner.

13. The panel mount connector according to claim 1, wherein the gasket is electrically conductive and is arranged between the collar and the snap-fit clip module.

14. An assembly, comprising:
- a panel having at least one opening:
- a panel mount connector received through the opening, including:

a housing, having:
a collar abutting against the panel; and
a receptacle adjacent to the collar;
a snap-fit clip module removably arranged within the receptacle and having at least one latching element pressing against the panel and mechanically fixing the panel mount connector in the panel; and
a gasket, a radially inwards protruding flap of the gasket is received in the receptacle and secures the gasket to the housing.

15. The assembly according to claim 14, wherein the panel secures the snap-fit clip module in the receptacle.

16. The assembly according to claim 14, wherein the snap-fit clip module and the housing include complementary catch elements that define a pivot axis around which the snap-fit clip module is held pivotable relative to the housing.

17. The assembly according to claim 16, wherein the snap-fit clip module and the housing include complementary securing elements engaging one another during the pivoting motion of the snap-fit clip into a catch position, and blocking a pivoting motion of the snap-fit clip module relative to the housing from the catch position to an initial position.

18. The assembly according to claim 14, wherein the snap-fit clip module defines a frame structure and a latch structure, the latch structure defining the at least one latching element, the frame structure defining an opening in which the latch structure is received, the latch structure extending from one side of the frame structure into the opening.

19. The assembly according to claim 14, wherein the receptacle defines a depression for receiving the at least one latching element as the at least one latching element is deflected radially inwards.

20. The assembly according to claim 14, wherein the gasket is electrically conductive and is arranged between the collar and the snap-fit clip module, the housing is plated with a conductive material and the snap-fit clip module is electrically isolating.

21. The panel mount connector according to claim 1, wherein the snap-fit clip module is clipped in the receptacle.

22. The panel mount connector according to claim 11, wherein a top surface of the frame structure is arranged flush with a top surface of a part of the housing surrounding the receptacle.

23. A panel mount connector adapted to be mounted to a panel, comprising:
a housing, including:
a collar adapted to abut against the panel; and
a receptacle; and
a snap-fit clip module removably arranged within the receptacle, the snap-fit clip module defines a frame structure and a latch structure, the latch structure defining at least one latching element adapted to generate a snap-fit with the panel, a top surface of the frame structure is arranged flush with a top surface of a part of the housing surrounding the receptacle.

* * * * *